E. TANGE.
MOTOR SLED.
APPLICATION FILED AUG. 12, 1914.
1,151,306.
Patented Aug. 24, 1915.
2 SHEETS—SHEET 1.
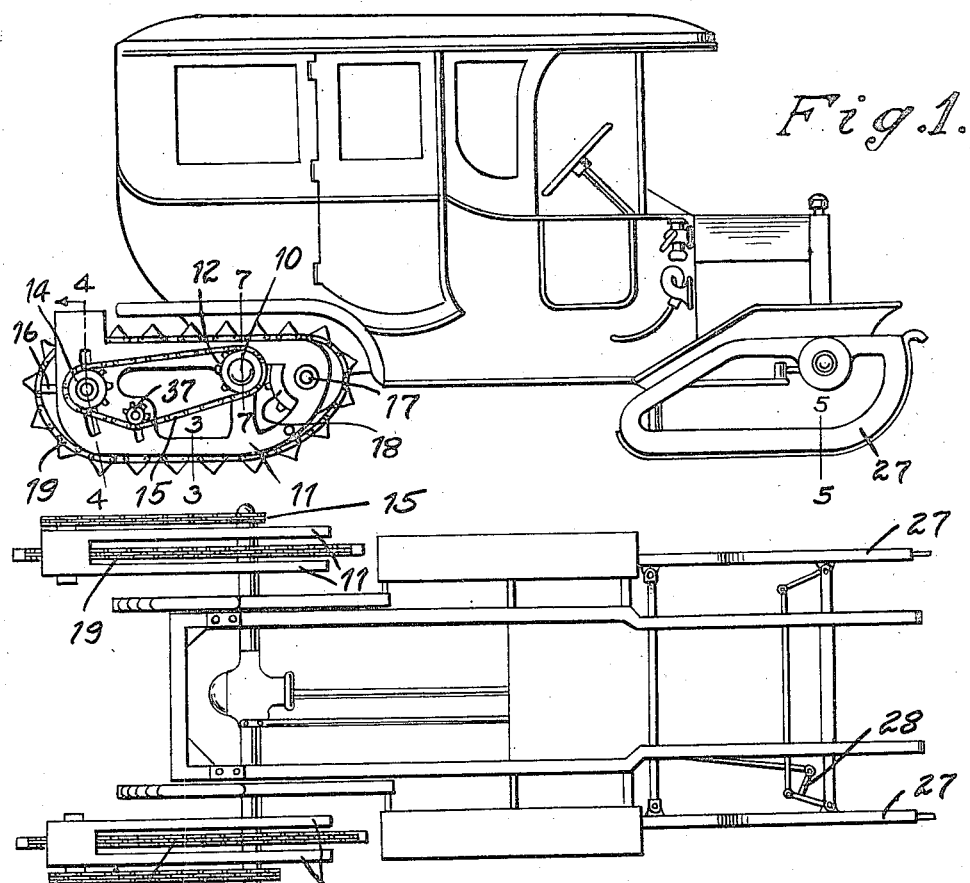
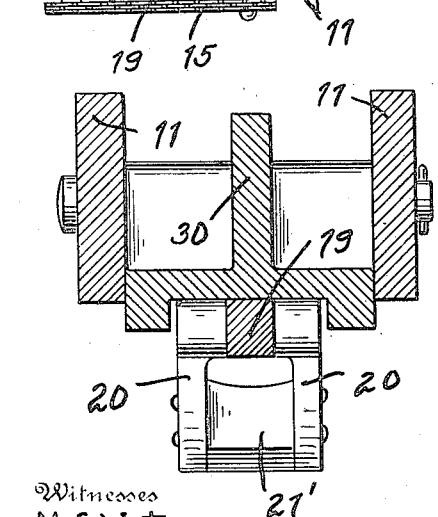
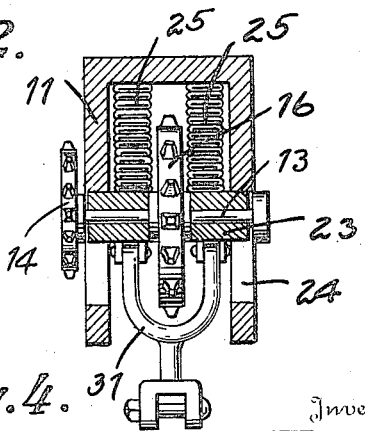

E. TANGE.
MOTOR SLED.
APPLICATION FILED AUG. 12, 1914.
1,151,306.
Patented Aug. 24, 1915.
2 SHEETS—SHEET 2.
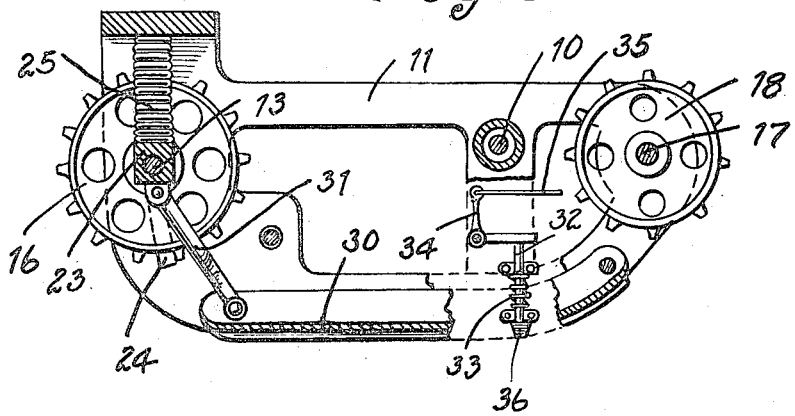
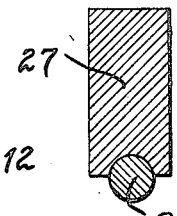
Fig. 5.
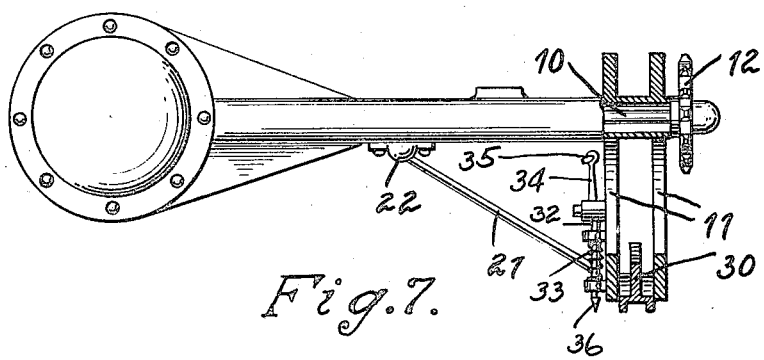
Fig. 7.
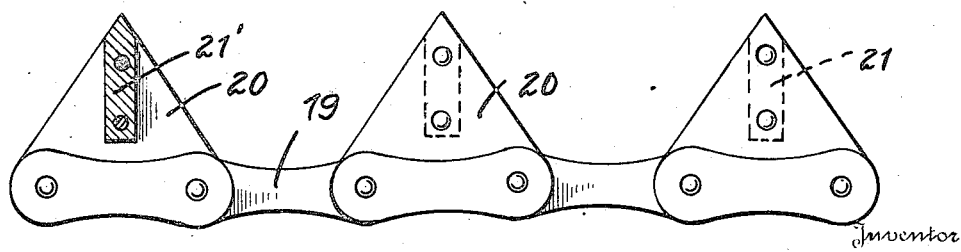
Fig. 8.
Witnesses
M. S. Watson
Harry M. Test
Inventor
E. Tange

UNITED STATES PATENT OFFICE.

ERNEST TANGE, OF EDINBURG, NEW YORK.

MOTOR-SLED.

1,151,306.  Specification of Letters Patent.  Patented Aug. 24, 1915.

Application filed August 12, 1914. Serial No. 856,435.

*To all whom it may concern:*

Be it known that I, ERNEST TANGE, a citizen of the United States, residing at Edinburg, in the county of Saratoga, State of New York, have invented certain new and useful Improvements in Motor-Sleds; and I do hereby declare the following to be a full, clear, and exact description of the invention, such as will enable others skilled in the art to which it appertains to make and use the same.

This invention relates to improvements in sled attachments for automobiles.

The principal object of the invention is to provide a novel and efficient device for attachment to an automobile in working the wheels whereby the automobile may be readily propelled over ice or snow.

Another object is to provide a novel snow or ice engaging chain which is driven from the automobile engine.

A further object is to provide novel means for mounting the driving chain whereby the chain will automatically adjust itself when the automobile is being propelled over ice or snow, the chain being adapted to dig deeper into the snow than it would in the ice.

Other objects and advantages will be apparent from the following description, when taken in connection with the accompanying drawings.

In the drawings: Figure 1 is a side elevation of an automobile equipped with my improved sleds. Fig. 2 is a plan view, the body of the automobile being removed. Fig. 3 is an enlarged vertical section on the line 3—3 of Fig. 1. Fig. 4 is an enlarged vertical sectional view on the line 4—4 of Fig. 1. Fig. 5 is an enlarged vertical sectional view through one of the front runners. Fig. 6 is an enlarged vertical longitudinal sectional view centrally through one of the rear runners. Fig. 7 is an enlarged sectional view on the line 7—7 of Fig. 1. Fig. 8 is an enlarged elevation of a section of the drive chain.

Referring particularly to the accompanying drawings, 10 represents the rear axle of the automobile. A pair of runner members 11 are provided with suitably formed openings which receive the ends of the said axle from which the wheels have been removed. On the ends of the axle, outwardly of the runners are mounted sprocket wheels 12, the axle being driven in the usual manner. Each of the runners is formed of two parallel portions properly spaced apart, and extending transversely of the rear of this runner is a shaft 13 carrying on the outer end a sprocket 14. Trained around this sprocket and around the sprocket 12 is a drive chain 15. Mounted on the shaft 13 between the runners of the member is a sprocket wheel 16, and mounted on a shaft 17 in the forward portion of the runner is a sprocket 18. Trained around these sprockets 16 and 18 is the snow or ice engaging chain 19. This chain is composed of a plurality of links, each of which consists of the triangular side plates 20 having their apexes directed outwardly and connected by the transversely extending plates 21′ which have their outer outer ends sharpened and arranged in a line with the apexes of the side plates. These apexes and sharpened plates are adapted to bite into the ice or snow to propel the automobile. Suitable braces 21 and 22 extend from the axles of the runner to hold the same in proper position. The shaft 13 is carried in boxes 23 which slide in the arcuate slots 24 formed in the side members of the runner, and bearing on these blocks are the springs 25. These springs normally hold the blocks in the lower ends of the slots so as to project the drive chain below the lower edges of the runner and in position to bite deeply into the snow.

Mounted on the front axle 26 are the sled runners 27, these runners being connected to the steering gear by means of the rods 28 so that both of the runners can be steered in the same manner as the wheels of the automobile. Each of the runners has a groove in its lower face in which is secured a round metal rod 29 for preventing skidding of the runners.

It will thus be seen that the chain 19 will be driven by the engine through the various sprockets and chains, and that by reason of the spring 25 the chain 19 will be forced downwardly below the lower face of the runner and bite deeply into the snow. Should the automobile be propelled over ice, the weight of the automobile will force the chains against the tensions of the springs so that they can only project far enough to bite into the surface of the ice.

Pivoted in the forward portion of each of the runners 11 and between the side members thereof is a plate 30, the rear end of which is pivotally connected with the block 23 by means of a forked link 31. Vertically slidable on the inner side of each of the runners 11 is a plunger 32 held in normal elevated position by the spring 33. Pivotally mounted on the runner is a bell crank lever 34, one arm of which is disposed over the upper end of the plunger while the other is connected with the foot pedal, (not shown) of the automobile by means of the rod 35. Thus by pulling on the rod 35, the bell crank will be rocked on its pivot and force the plunger downwardly so as to engage its sharpened lower end 36 in the ice or snow, and check the motion of the vehicle. Also mounted on each of the rear runners is a spring pressed tension sprocket 37 bearing on the train 15. This braking device is used on automobiles in which the brake drum is fastened on the wheel of the automobile, but where the brake is applied on a differential, the brake just described will not be necessary.

What is claimed is:

A sled propeller for attachment to the rear axle of an automobile comprising a sled member having longitudinally extending parallel side portions, a sprocket wheel mounted between the forward ends of the portions, a sprocket wheel mounted between the rear ends of the side portions, a propelling chain trained around the sprockets, a longitudinal member pivotally disposed between the side portions and bearing on the lower lap of the chain, resilient means for normally depressing the rear sprocket, and pivotal connections between the said depressing means and the said pivoted engaging means for simultaneously depressing said last named means.

In testimony whereof, I affix my signature, in the presence of two witnesses.

ERNEST TANGE.

Witnesses:
AUGUST BIEDINGER,
C. L. BROOKS.

Copies of this patent may be obtained for five cents each, by addressing the "Commissioner of Patents, Washington, D. C."